March 1, 1949.  M. GRAVES  2,463,265

REVERSIBLE TRANSMISSION

Filed Aug. 11, 1944

INVENTOR.
MARK GRAVES
BY
Oberlin, Limbach & Day.
ATTORNEYS

Patented Mar. 1, 1949

2,463,265

UNITED STATES PATENT OFFICE 2,463,265

REVERSIBLE TRANSMISSION

Mark Graves, Cleveland Heights, Ohio, assignor to The Cleveland Tapping Machine Company, Cleveland, Ohio, a corporation of Ohio Application August 11, 1944, Serial No. 548,960

8 Claims. (Cl. 74—792)

The present improvements relating as indicated to a transmission mechanism have more particular regard to the construction of such a transmission whereby, in addition to securing a speed reduction in the direct drive, a reversal in the direction of drive may likewise be simply and easily obtained.

In addition to such principal object, a further object of the invention is to provide a transmission which will normally stand in neutral position. Still another object is to provide means for shifting the transmission from direct to reverse drive from a point removed from the transmission, wherever found most convenient.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

Figure 1:
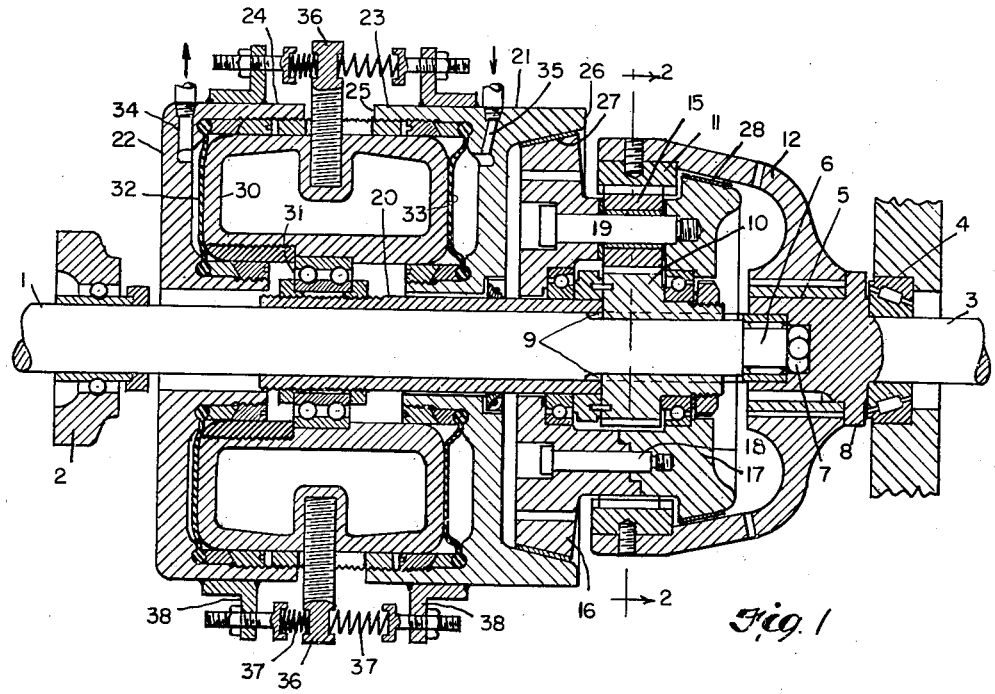
Figure 2:
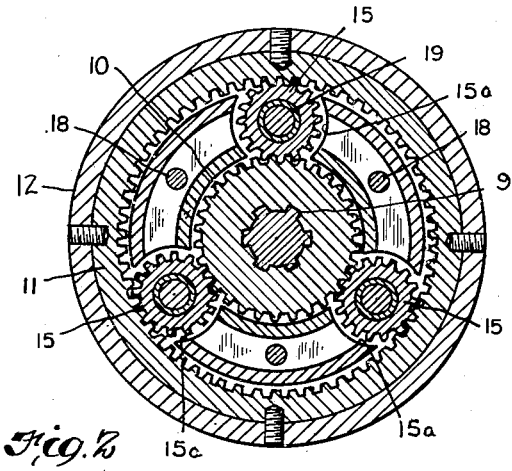

In said annexed drawing:

Fig. 1 is a sectional longitudinal view through a transmission embodying the principle of my invention; and Fig. 2 is a transverse section thereof, the plane of the section being indicated by the line 2—2, Fig. 1.

In the illustrated construction, the driving shaft 1, suitably supported in bearing 2, is aligned with the driven shaft 3 supported in bearing 4, power from any desired source (not shown) being applied to said first-named shaft and the second being connected to the mechanism which is to be operated through the transmission. Obviously, should it be found desirable, such second shaft may become the driving shaft and the first, the driven shaft. In order to retain the juxtaposed ends of the shaft in alignment, said shaft 3 is formed with a head 5 provided with a central recess in which the reduced end 6 of shaft 1 is received. A bearing 7 is provided in such bore to take up the end thrust of such shaft and the head 5 is furthermore provided with a shoulder 8 which abuts against bearing 4 to prevent endwise displacement of shaft 3.

Non-rotatably secured to the end of shaft 1, as by keyways or splines 9, is a central gear 10, while non-rotatably mounted on head 5 of shaft 3 is an annular gear 11 disposed in the same plane but spaced from said central gear. For the purpose of thus supporting said annular gear 11, a shell 12 with flaring side walls is utilized, the hub of such shell being keyed on to the head 5 and the annular gear being then pinned to the inner face of the shell adjacent the outer edge of the latter. This shell 12 also constitutes one element of a clutch, presently to be described, as well as an enclosure for the juxtaposed ends of the shafts and the reduction gearing, in effect a planetary gear, which serves to connect such ends, so that the one shaft may drive the other.

The remaining elements of such planetary gear comprise a plurality of pinions (three in number as shown, see Fig. 2) which lie between and mesh with said central gear 10 and annular gear 11, these pinions being carried by a member composed of two annular parts 16 and 17 which have opposed rabbetted faces as shown in the lower part of Fig. 1 and which, in assembled condition, are held together, so as to form in effect a unitary structure, by means of a plurality of set bolts 18 as well as by the spindles 19 on which the pinions 15 are journaled. Recesses 15a are provided in such juxtaposed faces of parts 16 and 17 to receive the respective pinions 15, the inwardly and outwardly directed teeth of such pinions being left clear for engagement with central gear 10 and annular gear 11, respectively.

The member which thus carries the pinions 15 is mounted for rotative movement about a sleeve 20 that surrounds and is longitudinally reciprocable on shaft 1. The two parts 16 and 17 which compose the member, through suitable bearings, laterally retain central gear 10. As a result, such gear will partake of any endwise movement of said member or in other words of said sleeve 20. The construction thus described also serves to retain said central gear at all times in transverse alignment with pinions 15, it being noted that the teeth on internal gear 11 are wider than the teeth on such pinions or central gear so that the pinions despite endwise movement of the member will at all times lie within said annular gear.

Adjacent the member thus described as the carrier for the pinions 15 is a stationarily mounted member of general cylindrical form exteriorly, said member being composed of two parts 21 and 22 formed with oppositely facing flanges 23 and 24 connected by a cylindrical shell 25 so as to form in effect an annular cylinder. Part 21 of said stationary member is also provided with a flange 26 that has an interiorly beveled face overlying the part 16 of the carrier member. Such part has a complementary beveled face 27 adapted to frictionally engage the face on flange 26 when the carrier member is moved to the right and so connect the two together. Similarly, part 17 of the carrier member has a beveled face 28 complementary to the inner wall of shell 12 which is adapted to frictionally engage the latter when the carrier member is moved to the right as shown in Fig. 1 and so clutch said member to said shell and thus to shaft 3.

Mounted for endwise reciprocation within the annular cylinder that constitutes the stationary member is a hollow, annular piston 30 which is rotatably mounted through the medium of a bearing 31 on the sleeve 20 but is held against longitudinal movement relative to such sleeve. Accordingly, it will be seen that reciprocable movement of the piston will serve to impart endwise movement in one direction or the other to the pinion-carrying member. Suitably secured within said stationary cylinder member adjacent the respective sides thereof are annular diaphragms 32 and 33 and leading into the spaces between such diaphragms and the corresponding side walls of the cylinder member are ducts 34 and 35 whereby a suitable pressure fluid may be introduced into or exhausted from such spaces as desired. Projecting radially outwardly from the piston 30 so as to extend through suitable longitudinal slots in the cylindrical wall of the stationary member are two or more pins 36, the outer ends of each such pin being received between similar opposed compression springs 37 adjustably mounted in lugs 38 on the stationary cylinder member.

Having thus described the detailed construction of my improved transmission, the mode of operation will now be briefly set forth. In the position of the parts illustrated in Fig. 1, it is assumed that fluid under pressure is being supplied through duct 35 to the space in the cylinder behind diaphragm 33. Accordingly, piston 30 has been moved to the left against the corresponding springs 37 shown as being the more compressed. As previously explained, movement of the piston in the direction in question correspondingly moves the pinion-carrying member so that the face 27 on part 16 of said member is engaged with the opposed face of flange 26 on the stationary cylinder member. In this condition of the parts said carrier member will be held stationary and rotative movement from driving shaft I will be imparted to driven shaft 3 through intermeshing central gear 10, the pinions 15 and the annular gear 11.

If, instead of supplying fluid under pressure through duct 35, such supply is through duct 34, piston 30 will be moved in the opposite direction to that just described, face 27 disengaged with the opposed face of flange 26 on the stationary cylinder member and clutch face 28 on the pinion-carrying member will be engaged with the opposed face of the housing 12 that is keyed onto the driven shaft 3. In this condition of the parts the drive shaft I will in effect be directly connected with the driven shaft 3 since the carrier member with the pinions 15 cannot rotate within the shell 12.

When no pressure fluid is supplied through either duct 34 or 35, the springs 37 will serve to maintain the piston in a central position in which neither face 27 nor 28 on the pinion-carrying member will be in engagement with the opposed face. In this neutral position of the piston and parts the drive shaft will in effect be disconnected from the driven shaft, since the pinion-carrying member will simply rotate idly between the central gear 10 and the internal gear 11.

It will thus be seen that I have provided an extremely simple and compact transmission mechanism whereby one shaft may be reversely driven from another with any desired reduction in relative rate of speed that may be obtained by varying the ratios of the central gear to the pinions and of the latter to the internal gear, as will be readily understood. Since the lines which serve to supply exhaust pressure fluid to the operating cylinder may be located at a distance therefrom, such control may be effected in any convenient point, either on the machine in which the transmission mechanism is incorporated, or elsewhere. The construction of the mechanism, furthermore, is such as to permit of the ready assembly and disassembly of the parts and the application of the mechanism to the driving and driven shafts.

Other modes of applying the principle of the invention may be employed, change being made as regards the details described, provided the features stated in any of the following claims or the equivalent of such be employed.

I, therefore, particularly point out and distinctly claim as my invention:

1. In mechanisms of the character described, the combination of aligned axially stationary driving and driven shafts, a central gear non-rotatably and slidably mounted on one of said shafts, a member fixedly mounted on the other shaft and carrying an internal gear radially spaced from said central gear, a stationarily mounted member surrounding said first shaft, said two members being provided with faces directed toward each other, a third member reciprocably mounted between said two members and provided with faces adapted upon reciprocation to engage the face on one or the other of said members or occupy a neutral position therebetween, and pinions carried by said third member, lying between and meshing with said central and internal gears respectively, said third member including portions thereon overlying opposite faces of said central gear to effect reciprocation of said central gear therewith, and reciprocable power means associated with said stationarily mounted member having rotatable but non-slidable connection with said third member and said central gear whereby upon actuation of said power means in opposite directions said third member and said central gear may be correspondingly reciprocated.

2. In mechanisms of the character described, the combination of aligned axially stationary driving and driven shafts, a central gear non-rotatably and slidably mounted on one of said shafts, a member fixedly mounted on the other shaft and carrying an internal gear radially spaced from said central gear, a stationarily mounted member surrounding said first shaft, said two members being provided with faces directed toward each other, a third member reciprocably mounted between said two members and provided with faces adapted upon reciprocation to engage the face on one or the other of said members or occupy a neutral position therebetween, pinions carried by said third member, lying between and meshing with said central and internal gears respectively, said third member including portions thereon overlying opposite faces of said central gear to effect reciprocation of said central gear therewith, a cylinder associated with said stationarily mounted member, and a piston reciprocable within said cylinder and having rotatable but non-slidable connection with said third member and said central gear, whereby upon admitting fluid pressure to said cylinder on one side or the other of said piston said third member and said central gear may be correspondingly reciprocated.

3. In mechanisms of the character described, the combination of aligned axially stationary driving and driven shafts, a central gear non-rotatably and slidably mounted on one of said shafts, a member fixedly mounted on the other shaft and carrying an internal gear radially spaced from said central gear, a stationarily mounted member surrounding said first shaft, said two members being provided with faces directed toward each other, a third member reciprocably mounted between said two members and provided with faces adapted upon reciprocation to engage the face on one or the other of said members or occupy a neutral position therebetween, pinions carried by said third member, lying between and meshing with said central and internal gears respectively, said third member including portions thereon overlying opposite faces of said central gear to effect reciprocation of said central gear therewith, an annular cylinder associated with said stationarily mounted member, and an annular piston reciprocable within said cylinder and having rotatable but non-slidable connection with said third member and said central gear, whereby upon admitting fluid pressure to said cylinder on one side or the other of said piston said third member and said central gear may be correspondingly reciprocated.

4. In mechanisms of the character described, the combination of aligned axially stationary driving and driven shafts, a central gear non-rotatably and slidably mounted on one of said shafts, a member fixedly mounted on the other shaft and carrying an internal gear radially spaced from said central gear, a stationarily mounted member surrounding said first shaft, said two members being provided with faces directed toward each other, a third member reciprocably mounted between said two members and provided with faces adapted upon reciprocation to engage the face on one or the other of said members or occupy a neutral position therebetween, pinions carried by said third member, lying between and meshing with said central and internal gears respectively, said third member including portions thereon overlying opposite faces of said central gear to effect reciprocation of said central gear therewith, an annular cylinder associated with said stationarily mounted member, an annular piston reciprocable within said cylinder and having rotatable but non-slidable connection with said third member and said central gear, whereby upon admitting fluid pressure to said cylinder on one side or the other of said piston said third member and said central gear may be correspondingly reciprocated, and springs compressed between said stationarily mounted member and said piston for urging said piston to an intermediate position in said cylinder in the absence of fluid pressure on either side of said piston to thus cause said third member to occupy a neutral position between the faces on said two members.

5. In mechanisms of the character described, the combination of aligned axially stationary driving and driven shafts, a central gear non-rotatably and slidably mounted on one of said shafts, a member fixedly mounted on the other shaft and carrying an internal gear radially spaced from said central gear, a stationarily mounted member surrounding said first shaft, said two members being provided with faces directed toward each other, a third member reciprocably mounted between said two members and provided with faces adapted upon reciprocation to engage the face on one or the other of said members or occupy a neutral position therebetween, pinions carried by said third member, lying between and meshing with said central and internal gears respectively, said third member including portions thereon overlying opposite faces of said central gear to effect reciprocation of said central gear therewith, and said stationarily mounted member comprising two spaced apart parts each formed with an inner and an outer annular flange defining an annular recess, and an intermediate tubular part connected to such outer flanges but retaining the opposed ends of such inner flanges spaced apart, and an annular piston having its opposite ends in such recesses and reciprocable therein, and having rotatable but non-slidable connection with said third member and said central gear whereby upon admitting fluid pressure to one or the other of such recesses said third member and said central gear may be correspondingly reciprocated.

6. In mechanisms of the character described, the combination of aligned axially stationary driving and driven shafts, a central gear non-rotatably and slidably mounted on one of said shafts, a member fixedly mounted on the other shaft and carrying an internal gear radially spaced from said central gear, a stationarily mounted member surrounding said first shaft, said two members being provided with faces directed toward each other, a third member reciprocably mounted between said two members and provided with faces adapted upon reciprocation to engage the face on one or the other of said members or occupy a neutral position therebetween, pinions carried by said third member, lying between and meshing with said central and internal gears respectively, said third member including portions thereon overlying opposite faces of said central gear to effect reciprocation of said central gear therewith, and said stationarily mounted member comprising two spaced apart parts each formed with an inner and an outer annular flange defining an annular recess, and an intermediate tubular part connected to such outer flanges but retaining the opposed ends of such inner flanges spaced apart, and an annular piston having its opposite ends in such recesses and reciprocable therein, and having rotatable but non-slidable connection with said third member and said central gear whereby upon admitting fluid pressure to one or the other of such recesses said third member and said central gear may be correspondingly reciprocated, said tubular part having an elongated slot therethrough and said piston having a radial projection thereon projected through such slot.

7. In mechanisms of the character described, the combination of aligned axially stationary driving and driven shafts, a central gear non-rotatably and slidably mounted on one of said shafts, a member fixedly mounted on the other shaft and carrying an internal gear radially spaced from said central gear, a stationarily mounted member surrounding said first shaft, said two members being provided with faces directed toward each other, a third member reciprocably mounted between said two members and provided with faces adapted upon reciprocation to engage the face on one or the other of said members or occupy a neutral position therebetween, pinions carried by said third member, lying between and meshing with said central and internal gears respectively, said third member including portions thereon overlying opposite faces of said central gear to effect reciprocation of said central gear therewith, and said stationarily mounted member comprising two spaced apart parts each formed with an inner and an outer annular flange defining an annular recess, and an intermediate tubular part connected to such outer flanges but retaining the opposed ends of such inner flanges spaced apart, and an annular piston having its opposite ends in such recesses and reciprocable therein, and having rotatable but non-slidable connection with said third member and said central gear whereby upon admitting fluid pressure to one or the other of such recesses said third member and said central gear may be correspondingly reciprocated, said tubular part having an elongated slot therethrough and said piston having a radial projection thereon projected through such slot, and springs compressed between opposite sides of such radial projection and each of said end parts for urging said piston to an intermediate position between such recesses in the absence of fluid pressure on either side of said piston to thus cause said third member to occupy a neutral position between the faces on said two members.

8. In mechanisms of the character described, the combination of aligned axially stationary driving and driven shafts, a central gear non-rotatably and slidably mounted on one of said shafts, a member fixedly mounted on the other shaft and carrying an internal gear radially spaced from said central gear, a stationarily mounted member surrounding said first shaft, said two members being provided with faces directed toward each other, a third member reciprocably mounted between said two members and provided with faces adapted upon reciprocation to engage the face on one or the other of said members or occupy a neutral position therebetween, pinions carried by said third member, lying between and meshing with said central and internal gears respectively, said third member including portions thereon overlying opposite faces of said central gear to effect reciprocation of said central gear therewith, and said stationarily mounted member comprising two spaced apart parts each formed with an inner and an outer annular flange defining an annular recess, and an intermediate tubular part connected to such outer flanges but retaining the opposed ends of such inner flanges spaced apart, and an annular piston having its opposite ends in such recesses and reciprocable therein, and having rotatable but non-slidable connection with said third member and said central gear whereby upon admitting fluid pressure to one or the other of such recesses said third member and said central gear may be correspondingly reciprocated, each of said recesses having a deformable annular diaphragm clamped therein whereby upon admitting fluid pressure into said end parts on one side of one of said diaphragms the other side of said diaphragm will engage one end of said piston and correspondingly move the same.

MARK GRAVES.

REFERENCES CITED

The following references are of record in the file of this patent:

UNITED STATES PATENTS

| Number | Name | Date |
|---|---|---|
| 1,435,021 | Omdal | Nov. 7, 1922 |
| 1,885,156 | Thomas | Nov. 1, 1932 |
| 2,373,122 | LaBrie | Apr. 10, 1945 |

FOREIGN PATENTS

| Number | Country | Date |
|---|---|---|
| 437,638 | France | Feb. 23, 1912 |
| 176,974 | Great Britain | Oct. 15, 1922 |
| 356,094 | Great Britain | Sept. 3, 1931 |
| 649,436 | Germany | Aug. 24, 1937 |